US010634777B2

(12) United States Patent
Oh et al.

(10) Patent No.: US 10,634,777 B2
(45) Date of Patent: Apr. 28, 2020

(54) RADAR ODOMETRY FOR VEHICLE

(71) Applicant: Ford Global Technologies, LLC, Dearborn, MI (US)

(72) Inventors: Jinhyoung Oh, Fremont, CA (US); Mohsen Lakehal-ayat, Mountain view, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/993,368

(22) Filed: May 30, 2018

(65) Prior Publication Data
US 2019/0369222 A1  Dec. 5, 2019

(51) Int. Cl.
*G01S 13/50* (2006.01)
*G05D 1/02* (2020.01)
(Continued)

(52) U.S. Cl.
CPC ............. *G01S 13/50* (2013.01); *G01S 13/08* (2013.01); *G05D 1/0257* (2013.01); *G05D 1/101* (2013.01);
(Continued)

(58) Field of Classification Search
CPC ......... G01S 13/50; G01S 13/08; G05D 1/101; G05D 1/0257; G05D 2201/0213; B64C 2201/024; B64C 2201/141; B64C 39/024
See application file for complete search history.

(56) References Cited

U.S. PATENT DOCUMENTS 5,537,118 A * 7/1996 Appriou ............... G01S 13/726
                                                          342/95
5,877,901 A * 3/1999 Enomoto ............... G02B 13/06
                                                          359/681
(Continued)

FOREIGN PATENT DOCUMENTS

DE  102013019804 A1   5/2015
JP      3837160 B2   10/2006

OTHER PUBLICATIONS

D. Kellner, M. Barjenbruch, J. Klappstein, J. Dickmann, and K. Dietmayer, "Instantaneous Ego-Motion Estimation using Multiple Doppler Radars," 2014 IEEE International Conference on Robotics & Automation, pp. 1592-1597, 2014.
(Continued)

*Primary Examiner* — Frederick M Brushaber
(74) *Attorney, Agent, or Firm* — David R. Stevens; Stevens Law Group (57) ABSTRACT

Techniques and examples pertaining to vehicle odometry using one or more radars disposed on a vehicle are described. A method for radar odometry may involve receiving, by a processor from the radars, measurement data of stationary objects and moving objects that are located in an environment a vehicle is traversing. The method may also involve performing, by the processor, a random sample consensus (RANSAC) calculation to select the measurement data of the stationary objects and disregard the measurement data of the moving objects. The method may also involve calculating, by the processor, one or more dynamic variables of the vehicle based on the measurement data of the stationary objects. The proposed method processes the measurement data of the stationary objects with one single RANSAC calculation and one least squares problem solving, thereby greatly reducing computation cost and time as
(Continued)

well as latency in operation for providing the vehicle odometry.

20 Claims, 7 Drawing Sheets (51) Int. Cl.
*G01S 13/08* (2006.01)
*G05D 1/10* (2006.01)
*B64C 39/02* (2006.01)

(52) U.S. Cl.
CPC ...... *B64C 39/024* (2013.01); *B64C 2201/024* (2013.01); *B64C 2201/141* (2013.01); *G05D 2201/0213* (2013.01)

(56) References Cited

U.S. PATENT DOCUMENTS

| | | |
|---|---|---|
| 8,855,848 B2 | 10/2014 | Zeng |
| 9,199,643 B1 | 12/2015 | Zeng |
| 10,088,549 B2 * | 10/2018 | Nielsen ................ G01S 5/0263 |
| 2009/0263009 A1 * | 10/2009 | Krishnaswamy .... G05D 1/0253 382/154 |
| 2011/0316980 A1 * | 12/2011 | Dubbelman ......... G06K 9/6211 348/47 |
| 2012/0155711 A1 * | 6/2012 | Ryoo ................. G06K 9/00805 382/104 |
| 2014/0139635 A1 * | 5/2014 | Chandraker ......... H04N 13/204 348/46 |
| 2015/0183431 A1 * | 7/2015 | Nanami ................ B60W 40/04 701/301 |
| 2015/0199556 A1 * | 7/2015 | Qian .................... G06K 9/0063 382/215 |
| 2016/0178742 A1 | 6/2016 | Shikatani |
| 2016/0223661 A1 | 8/2016 | Song |
| 2016/0377698 A1 * | 12/2016 | Nielsen ................ G01S 5/0263 342/450 |
| 2017/0004379 A1 * | 1/2017 | Ramalingam ...... G06K 9/00791 |
| 2018/0075609 A1 * | 3/2018 | He ............................ G06T 7/20 |

OTHER PUBLICATIONS

Localization and Mapping Using Only a Rotating FMCW Radar Sensor.

* cited by examiner

RADAR ODOMETRY FOR VEHICLE

TECHNICAL FIELD

The present disclosure generally relates to automotive vehicles and, more particularly, to methods and apparatuses of determining odometry of a moving vehicle using real-time radio detection and ranging ("RADAR", or "radar") measurement of stationary objects around the moving vehicle.

BACKGROUND

Odometry is the use of data, typically acquired or otherwise sensed by various sensors equipped in a vehicle, to estimate a change in position of the vehicle over time especially when the vehicle is moving. Specifically, a few dynamic variables of the vehicle, such as linear velocities and angular velocities of the vehicle, are required for estimation of the change in position of the vehicle. The closer the estimation to an actual position of the vehicle, the more accurate the odometry is. Accurate odometry plays an important role in characterizing the vehicle's various dynamic properties, including critical data for controlling or otherwise navigating the vehicle, especially if the vehicle is unmanned or autonomously operated. For example, for a vehicle such as an automotive vehicle, a mobile robot or an airborne drone, accurate odometry may provide precise information about the vehicle's position, orientation, linear velocities and angular velocities with respect to its surrounding two-dimensional (2D) or three-dimensional (3D) environment. The dynamic information is crucial in applications such as stability control and accurate navigation of the vehicle.

Conventionally, for automotive vehicles, odometry may be achieved using wheel odometry for estimating linear velocities, and through a vehicle-embedded inertial measurement unit (IMU) for measuring angular velocities. However, wheel odometry has limited accuracy due to factors such as tire size uncertainties (e.g., user modification of tires or insufficient tire pressure) and a low wheel encoder resolution. IMU also suffers measurement errors especially in low speed maneuvers. Mobile robots and drones have conventionally been using visual odometry (via cameras equipped on the vehicle) along with IMU. However, visual odometry often suffers from an integration drift problem; namely, measurement errors in linear and/or angular velocities may integrate or otherwise accumulate over time, causing a random unbounded drift to appear in the calculated navigation position and/or altitude.

Recently, odometry based on global positioning system (GPS) and light detection and ranging ("LIDAR", or "lidar") technologies has been developed, as more vehicles are equipped with advanced driver assistance system (ADAS) sensors that may include a GPS or a lidar. However, GPS may not function at places where satellite reception is limited (e.g., in a tunnel), whereas lidar does not work in all weather conditions.

Moreover, many existing odometry methods are limited to providing 2D dynamic variables only (i.e., linear and angular velocities of the vehicle on a 2D plane), and not able to provide dynamic variables of the vehicle in a 3D space. The 2D variables are insufficient for control and a navigation of a vehicle traversing in a 3D space (e.g., a drone), which requires a 3D odometry capability.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1:
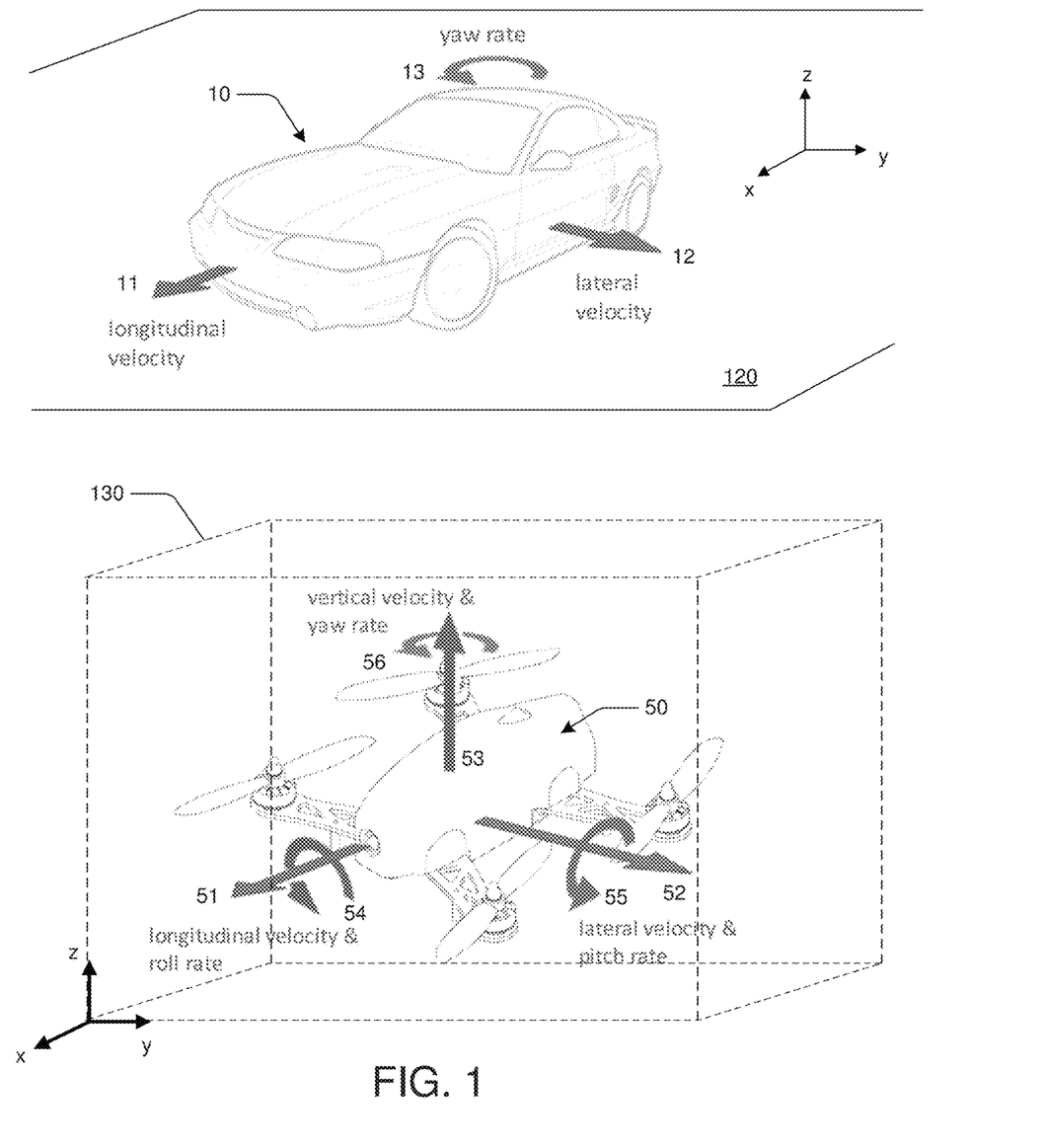
FIG. 1 is a diagram depicting example dynamic variables of vehicles traversing 2D and 3D environments.

As described above, accurate odometry is crucial for vehicles that operate largely on a 2D plane (e.g., an automotive vehicle) or in a 3D space (e.g., an airborne drone). That is, in order to control, adjust, calibrate, navigate or otherwise maneuver a vehicle, dynamic variables of the vehicle, such as linear velocities and angular velocities that are shown in FIG. 1, may needed to be accurately determined through an odometry method. FIG. 1 illustrates a first vehicle 10 (e.g., an automotive vehicle) along with three dynamic variables associated with vehicle 10. FIG. 1 also illustrates a second vehicle 50, (e.g., an airborne drone) along with six dynamic variables associated with vehicle 50. Specifically, vehicle 10, being operated to move largely on a 2D plane 120, may be characterized by three dynamic variables: longitudinal velocity 11, lateral velocity 12 and yaw rate 13. Longitudinal velocity 11 represents a linear velocity component of vehicle 10 in a longitudinal direction with respect to vehicle 10 on 2D plane 120, usually toward the front of vehicle 10 and interchangeably referred as "x-axis" or "x-direction". Lateral velocity 12 represents a linear velocity component of vehicle 10 in a lateral direction of vehicle 10 on 2D plane 120, which is orthogonal to the longitudinal direction and interchangeably referred as "y-axis" or "y-direction". Yaw rate 13 represents an angular velocity of vehicle 10 around an axis (usually referred as "z-axis" or "z-direction") that is perpendicular to 2D plane 120.

Similarly, vehicle 50, being operated to move largely in a 3D space 130, may be characterized by six dynamic variables: longitudinal velocity 51, lateral velocity 52, vertical velocity 53, roll rate 54, pitch rate 55 and yaw rate 56. Longitudinal velocity 51, lateral velocity 52 and yaw rate 56 are defined with respect to vehicle 50 in 3D space 130 in a similar way that longitudinal velocity 11, lateral velocity 12 and yaw rate 13 are defined with respect to vehicle 10 on 2D plane 120. Namely, longitudinal velocity 51 represents a linear velocity component of vehicle 50 in a longitudinal direction with respect to vehicle 50 in 3D space 130, interchangeably referred as "x-axis" or "x-direction". Lateral velocity 52 represents a linear velocity component of vehicle 50 in a lateral direction of vehicle 50 in 3D space 130, which is orthogonal to the longitudinal direction and interchangeably referred as "y-axis" or "y-direction". Vertical velocity 53 represents a linear velocity component of vehicle 50 in a vertical direction of vehicle 50 in 3D space 130, which is orthogonal to both the longitudinal direction and the lateral direction in 3D space 130, and interchangeably referred as "z-axis" or "z-direction". Roll rate 54, pitch rate 55 and yaw rate 56 each represents an angular velocity of vehicle 50 around the x-axis, the y-axis and the z-axis in 3D space 130, respectively.

The present disclosure presents methods and apparatuses for realizing radar odometry. That is, the present disclosure presents methods and apparatuses for providing accurate estimate or calculation for the dynamical variables of a vehicle, such as those illustrated in FIG. 1, using measurement data collected by one or more radar devices, or radars, equipped in or on the vehicle. Preferably, Doppler radars are used for their higher measurement accuracy as compared to other types of automotive radars. Although radar odometry according to the present disclosure is demonstrated below mainly using vehicle 10 traversing 2D plane 120 as an embodiment, the same radar odometry method is applicable to vehicle 50 traversing 3D space 130 as another embodiment.

Figure 2:
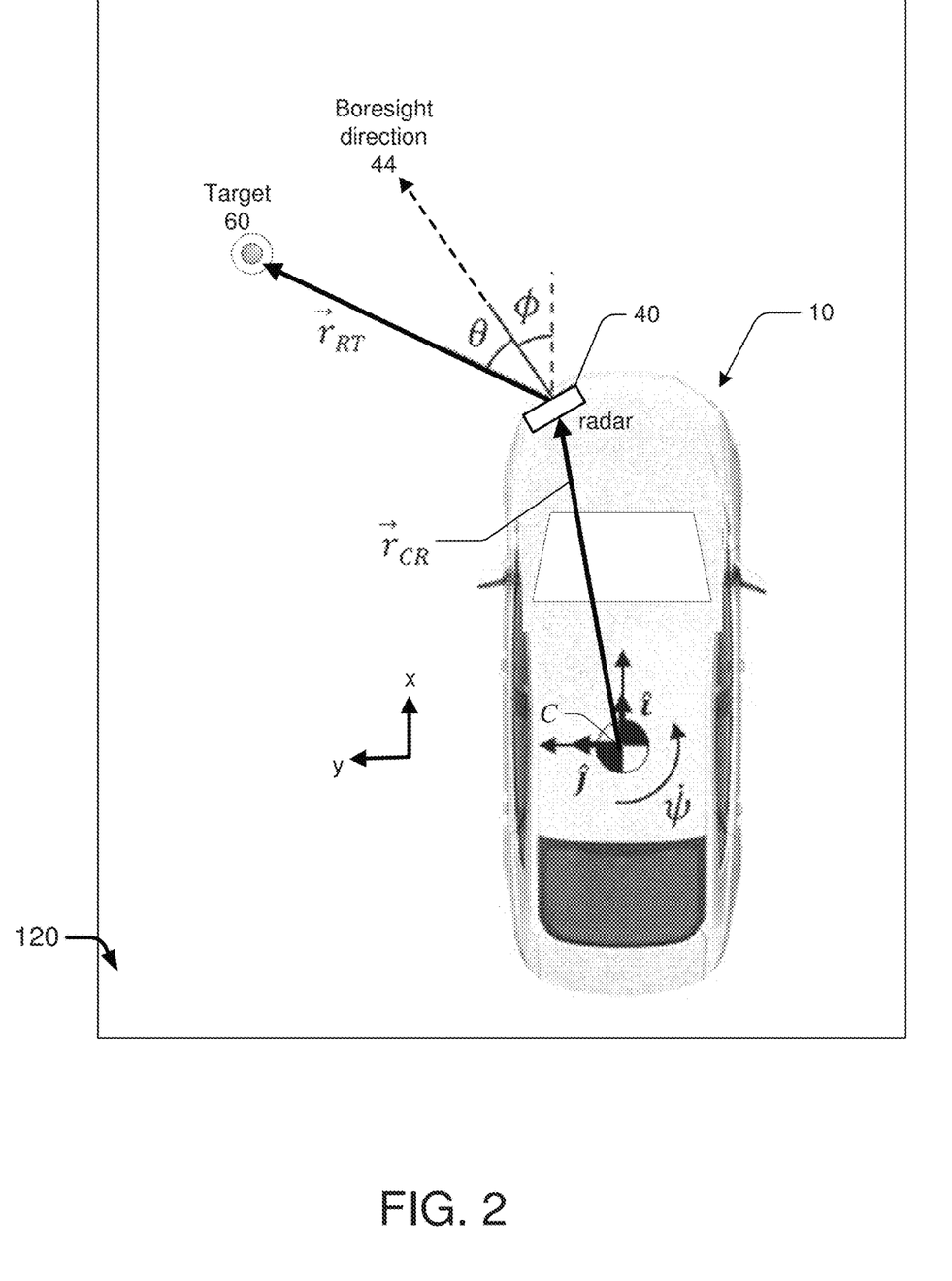
FIG. 2 is a diagram illustrating an example target detection for radar odometry in accordance with the present disclosure.

FIG. 2 illustrates a top view of vehicle 10, along with a radar 40 disposed near the front end of vehicle 10, as vehicle 10 traverses 2D plane 120. Radar 40 is used to detect one or more stationary objects (i.e., stationary with respect to 2D plane 120), such as target 60 of FIG. 2, as vehicle 10 traverses on plane 120. Radar 40 may have a boresight direction 44, which typically defines an axis of maximum antenna gain of radar 40. That is, radar 40 may emit most of its radiated electromagnetic power along boresight direction 44 when detection a surrounding environment of vehicle 10. As described above and shown in FIG. 2, an x-direction may be defined to align with a forward direction of vehicle 10, i.e., a direction vehicle 10 heads toward by default. A few installation parameters of radar 40 may be used to define a location and an orientation of radar 40 with respect to vehicle 10. The installation parameters may include a 2D position vector, denoted as $\vec{r}_{CR}$ in FIG. 2, from a reference point of vehicle 10 (e.g., the center of mass, or any arbitrary point, of vehicle 10) to a reference point of radar 40 (e.g., the center of mass, the origin of the sensor coordinate system, or any arbitrary point, of radar 40). The reference point of vehicle 10 is denoted as C in FIG. 2. In addition, the installation parameters may include a radar mounting angle, denoted as φ in FIG. 2, defined as the angle between the x-direction of vehicle 10 and boresight direction 44 of radar 40. The installation parameters of radar 40 are of known and fixed values once radar 40 is installed or otherwise disposed on vehicle 10.

As illustrated in FIG. 1, radar odometry may provide estimates of dynamic variables of vehicle 10 that include longitudinal velocity 11, lateral velocity 12 and yaw rate 13. Yaw rate 13 of vehicle 10 is denoted as $\dot{\psi}$ in FIG. 2. With longitudinal velocity 11 denoted as $v_{C_x}$ and lateral velocity 12 denoted as $v_{C_y}$, a velocity of vehicle 10 at reference point C, $\vec{v}_C$, as vehicle 10 traverses 2D plane 120, may be represented as:

$$\vec{v}_C = v_{C_x}\hat{i} + v_{C_y}\hat{j}, \qquad (1)$$

wherein $\hat{i}$ represents x-axis unit vector of vehicle 10 and $\hat{j}$ represents y-axis unit vector of vehicle 10.

The velocity of target 60 may be represented using a 2D vector, $\vec{v}_T$, that fulfills the following relation:

$$\vec{v}_T = \vec{v}_C + \dot{\vec{r}}_{CR} + \dot{\vec{r}}_{RT}, \qquad (2)$$

wherein $\vec{r}_{RT}$ represents a 2D position vector from radar 40 to target 60, as shown in FIG. 2, and thus $\dot{\vec{r}}_{RT}$ represents the Doppler speed of target 60 as measured by radar 40.

The second term on the right-hand side of equation (2) may be written as:

$$\dot{\vec{r}}_{CR} = -r_{CR_y}\dot{\psi}\hat{i} + r_{CR_x}\dot{\psi}\hat{j}, \qquad (3)$$

wherein $r_{CR_x}$ and $r_{CR_y}$ are x-coordinate and y-coordinate of $\vec{r}_{CR}$, respectively, and noting that $\dot{r}_{CR_x} = \dot{r}_{CR_y} = 0$, $\dot{\hat{i}} = \dot{\psi}\hat{j}$, and $\dot{\hat{j}} = -\dot{\psi}\hat{i}$.

Referring to FIG. 2 and noting that $\dot{\phi}=0$, $\dot{\hat{i}}=\dot{\psi}\hat{j}$, and $\dot{\hat{j}}=-\dot{\psi}\hat{i}$, the third term on the right-hand side of equation (2) may be written as:

$$\dot{\vec{r}}_{RT} = \frac{d}{dt}[r\cos(\theta+\phi)\hat{i} + r\sin(\theta+\phi)\hat{j}] = \qquad (4)$$
$$[\dot{r}\cos(\theta+\phi) - r\dot{\theta}\sin(\theta+\phi) - r\dot{\psi}\sin(\theta+\phi)]\hat{i} +$$
$$[\dot{r}\sin(\theta+\phi) + r\dot{\theta}\cos(\theta+\phi) + r\dot{\psi}\cos(\theta+\phi)]\hat{j}.$$

wherein r represents the radial distance of target 60 as measured by radar 40, $\dot{r}$ represents the radial speed of target 60 as measured by radar 40, and θ, also shown in FIG. 2, represents the azimuth angle of target 60 as measured by radar 40.

Using equations (1), (3) and (4), equation (2) may be written as $$\vec{v}_T = (v_{C_x} - r_{CR_y}\dot{\psi} + \dot{r}\cos(\theta+\phi) - r\dot{\theta}\sin(\theta+\phi) - r\dot{\psi}\sin(\theta+\phi))\hat{i} + (v_{C_y} + r_{CR_x}\dot{\psi} + \dot{r}\sin(\theta+\phi) + r\dot{\theta}\cos(\theta+\phi) + r\dot{\psi}\cos(\theta+\phi))\hat{j}. \qquad (5)$$

Assuming that target 60 is a stationary object, it dictates that $\vec{v}_T = 0$, and thus the following equation can be derived:

$$\dot{r} + (v_{C_y} + r_{CR_x}\dot{\psi})\sin(\theta+\phi) + (v_{C_x} - r_{CR_y}\dot{\psi})\cos(\theta+\phi) = 0. \qquad (8)$$

It is worth noting that equation (8) is a first order linear equation with vehicle 10's linear and angular velocities as variables: $v_{C_x}$ (i.e., longitudinal velocity 11), $v_{C_y}$ (i.e., lateral velocity 12) and $\dot{\psi}$ (i.e., yaw rate 13). Coefficients of equation (8) includes radar measurements of target 60 by radar 40 (i.e., $\dot{r}$ and θ), as well as installation parameters of radar 40 (i.e., wherein $r_{CR_x}$, $r_{CR_y}$ and φ). For each stationary object detected by radar 40, an associated equation (8) may be written. Therefore, when multiple stationary objects are detected by radar 40, a set of equations (8) each associated with one of the stationary objects may be generated. The set of equations (8), each being a first order linear equation of vehicle 10's linear and angular velocities, may thus form a least squares problem in mathematical sense. One may then solve the least squares problem to obtain the linear and angular velocities of vehicle 10, thereby achieving odometry of vehicle 10.

When applied to multiple stationary objects, radar odometry as presented above may also benefit from an inherent noise cancellation. That is, when radar 40 measures a plurality of stationary objects like target 60, the resulted dynamic variables of vehicle 10 may be inherently more accurate, as measurement errors introduced by noise in radar 40 and in ambient environment will be mutually canceled or otherwise compensated for in the process of solving the least squares problem, resulting in estimates of linear and angular velocities of vehicle 10 with higher accuracy.

In addition to detecting multiple stationary objects using one radar disposed on vehicle 10, the radio odometry method disclosed above may be applicable to a scenario in which multiple radar devices are used by vehicle 10 to detect multiple stationary objects. For example, vehicle 10 may be equipped with N radars, and there may be K stationary objects in the surrounding environment of vehicle 10 to be detected by each of the N radars. Let $\dot{r}_k^n$ and $\theta_k^n$ be the radial speed and the azimuth angle, respectively, of the k-th object as detected by the n-th radar. Therefore, for the k-th object detected by the n-th radar, equation (8) may be written as:

$$\dot{r}_k^n + (v_{C_y} + r_{CR_x}^n \dot{\psi})\sin(\theta_k^n + \phi^n) + (v_{C_x} - r_{CR_y}^n \dot{\psi})\cos(\theta_k^n + \phi^n) = 0, \quad (9)$$

wherein n=1, ..., N, and k=1, ..., K. Note that equation (9) includes installation parameters of the N radars; that is, $r_{CR_x}^n$ and $r_{CR_y}^n$ are x and y coordinates of n-th radar with respect to reference point C of vehicle 10, respectively, and $\phi^n$ is the radar mounting angle of n-th radar with respect to x-direction. As described above, all of the radar installation parameters are known value in the least squares problem. Equation (9) represents the least squares problem of N radars detecting K stationary objects. Written in matrix form, equation (9) may become:

$$\begin{bmatrix} \cos(\theta_1^1 + \phi^1) & \sin(\theta_1^1 + \phi^1) & r_{CR_x}^1 \sin(\theta_1^1 + \phi^1) - r_{CR_y}^1 \cos(\theta_1^1 + \phi^1) \\ \vdots & \vdots & \vdots \\ \cos(\theta_K^1 + \phi^1) & \sin(\theta_K^1 + \phi^1) & r_{CR_x}^1 \sin(\theta_K^1 + \phi^1) - r_{CR_y}^1 \cos(\theta_K^1 + \phi^1) \\ \vdots & \vdots & \vdots \\ \cos(\theta_1^N + \phi^N) & \sin(\theta_1^N + \phi^N) & r_{CR_x}^N \sin(\theta_1^N + \phi^N) - r_{CR_y}^N \cos(\theta_1^N + \phi^N) \\ \vdots & \vdots & \vdots \\ \cos(\theta_K^N + \phi^N) & \sin(\theta_K^N + \phi^N) & r_{CR_x}^N \sin(\theta_K^N + \phi^N) - r_{CR_y}^N \cos(\theta_K^N + \phi^N) \end{bmatrix} \begin{bmatrix} v_{C_x} \\ v_{C_y} \\ \dot{\psi} \end{bmatrix} + \begin{bmatrix} \dot{r}_1^1 \\ \vdots \\ \dot{r}_K^1 \\ \vdots \\ \dot{r}_1^N \\ \vdots \\ \dot{r}_K^N \end{bmatrix} = 0. \quad (10)$$

Equation (10) may be simplified in representation or otherwise re-written in an alternative form by defining the following matrices:

$$X = [\cos(\theta_1^1 + \phi^1) \ldots \cos(\theta_K^1 + \phi^1) \ldots \cos(\theta_1^N + \phi^N) \ldots \cos(\theta_K^N + \phi^N)]^T, \quad (11)$$

$$Y = [\sin(\theta_1^1 + \phi^1) \ldots \sin(\theta_K^1 + \phi^1) \ldots \sin(\theta_1^N + \phi^N) \ldots \sin(\theta_K^N + \phi^N)]^T, \quad (12)$$

$$Z = \begin{bmatrix} r_{CR_x}^1 \sin(\theta_1^1 + \phi^1) - r_{CR_y}^1 \cos(\theta_1^1 + \phi^1) \\ \vdots \\ r_{CR_x}^1 \sin(\theta_K^1 + \phi^1) - r_{CR_y}^1 \cos(\theta_K^1 + \phi^1) \\ \vdots \\ r_{CR_x}^N \sin(\theta_1^N + \phi^N) - r_{CR_y}^N \cos(\theta_1^N + \phi^N) \\ \vdots \\ r_{CR_x}^N \sin(\theta_K^N + \phi^N) - r_{CR_y}^N \cos(\theta_K^N + \phi^N) \end{bmatrix}, \quad (13)$$

$$W = [\dot{r}_1^1 \ldots \dot{r}_K^1 \ldots \dot{r}_1^N \ldots \dot{r}_K^N]^T. \quad (14)$$

Note that each of matrices X, Y, Z and W comprises an N·K by 1 matrix, i.e., a matrix having N·K rows and 1 column. Also note that each element of matrices X, Y, Z and W comprises installation parameter(s) of a radar and/or measurement parameter(s) of a stationary object as measured by a radar of vehicle 10. With matrices X, Y, Z and W defined in equations (11)-(14), equation (10) can be re-written as:

$$[X \ Y \ Z] \begin{bmatrix} v_{C_x} \\ v_{C_y} \\ \dot{\psi} \end{bmatrix} + W = 0. \quad (15)$$

Hence, linear and angular velocities of vehicle 10, namely, $v_{C_x}$ (i.e., longitudinal velocity 11), $v_{C_y}$ (i.e., lateral velocity 12) and $\dot{\psi}$ (i.e., yaw rate 13), may be obtained substantially simultaneously by solving the least squares problem represented by equation (15).

In some embodiments, angular velocity $\dot{\psi}$ (i.e., yaw rate 13) in equation (9) may be regarded as a known variable. For example, vehicle 10 may rely on a gyroscope or other IMU equipped in vehicle 10 to determine yaw rate 13. In this scenario, the least squares problem represented by equation (9) may be written in matrix form as follows:

$$[X \ Y] \begin{bmatrix} v_{C_x} \\ v_{C_y} \end{bmatrix} + Z' = 0, \quad (17)$$

wherein matrix Z', being also an N·K by 1 matrix, is defined as:

$$Z' = \begin{bmatrix} r_{CR_x}^1 \dot{\psi} \sin(\theta_1^1 + \phi^1) - r_{CR_y}^1 \dot{\psi} \cos(\theta_1^1 + \phi^1) + \dot{r}_1^1 \\ \vdots \\ r_{CR_x}^1 \dot{\psi} \sin(\theta_K^1 + \phi^1) - r_{CR_y}^1 \dot{\psi} \cos(\theta_K^1 + \phi^1) + \dot{r}_K^1 \\ \vdots \\ r_{CR_x}^N \dot{\psi} \sin(\theta_1^N + \phi^N) - r_{CR_y}^N \dot{\psi} \cos(\theta_1^N + \phi^N) + \dot{r}_1^N \\ \vdots \\ r_{CR_x}^N \dot{\psi} \sin(\theta_K^N + \phi^N) - r_{CR_y}^N \dot{\psi} \cos(\theta_K^N + \phi^N) + \dot{r}_K^N \end{bmatrix}. \quad (18)$$

Similar to matrices X, Y, Z and W, each element of matrix Z' also comprises installation parameter(s) of a radar and/or measurement parameter(s) of a stationary object as measured by a radar of vehicle 10. Hence, with yaw rate 13 regarded as a known parameter, linear velocities of vehicle 10, namely, $v_{C_x}$ (i.e., longitudinal velocity 11) and $v_{C_y}$ (i.e., lateral velocity 12), may be obtained by solving the least squares problem represented by equation (17).

It is worth noting the equations above are derived based on an assumption that each of the K objects detected by the N radars is a stationary object. That is, each of the K objects has zero velocity on 2D plane 120 or in 3D space 130, and therefore each of matrices X, Y, Z, Z' and W has a matrix size of N·K elements, with each of element corresponding to a respective one of the K objects detected by a respective one of the N radars. This assumption, however, is not valid in an actual environment. An actual environment is likely to include both stationary objects (i.e., objects that are stationary within the environment) as well as moving objects (i.e., objects that are moving within the environment). For example, in addition to K objects that are stationary, the actual environment may also include P objects that are moving. Radars disposed in or on vehicle 10 or vehicle 50 would detect the (K+P) objects in the surrounding environment of vehicle 10 or vehicle 50, regardless stationary or moving. That is, measurement data (e.g., radial distance, radial speed and azimuth angle of detected objects) obtained by the N radars may include data from both the K stationary objects (which is desired) and the P moving objects (which is undesired). Whereas measurement data from stationary objects are useful in constructing a correct least squares problem (e.g., as shown in equations 9, 10 or 15) which can be solved to obtain the dynamic variables of vehicle 10 or vehicle 50, measurement data from moving objects are undesired as it would disturb or otherwise skew the least square problem, which leads to inaccurate estimates of the dynamic variables of vehicle 10 or vehicle 50 when solving the least square problem. Therefore, a screening method is needed to differentiate measurement data of stationary objects from measurement data of moving objects.

To eliminate most, if not all, of the unwanted measurement data that comes from moving objects, a data filtering algorithm or selection process may be employed. To this end, one or more of various data processing techniques may be utilized, and may be implemented using a software approach, a hardware approach, or a combination of both. In an embodiment below, a random sample consensus (RANSAC) algorithm is used as an example without an intention to limit the scope of the present disclosure. RANSAC is an iterative method that is able to estimate parameters of a mathematical model from a set of observed data that contains outliers. That is, among measurement data of the (K+P) objects as detected by the N radars, if number of detections from stationary objects are dominant, the detections from moving objects will appear as outliers.

The outliers may be identified visually if measurement data of the (K+P) objects as detected by the N radars are plotted in a mathematical coordinated space. Take the least squares problem represented by equation (17) as an example. For each detection of one of the (K+P) objects by one of the N radars, a corresponding representative point may be plotted in a 3D mathematical space, with the three coordinates of the representative point having values of corresponding elements of matrices X, Y and Z', respectively. Specifically, for the k-th object of the (K+P) objects as detected or otherwise measured by the n-th radar of the N radars, a representative point may be plotted in the mathematical space to represent the measurement, with each of the coordinates of the representative point being a corresponding element of matrices X, Y and Z', i.e., $\cos(\theta_k''+\phi'')$, $\sin(\theta_k''+\phi'')$ and $r_{CR_x}''\dot\psi \sin(\theta_k''+\phi'')-r_{CR_y}''\dot\psi \cos(\theta_k''+\phi'')+\dot r_k''$.

Figure 3:
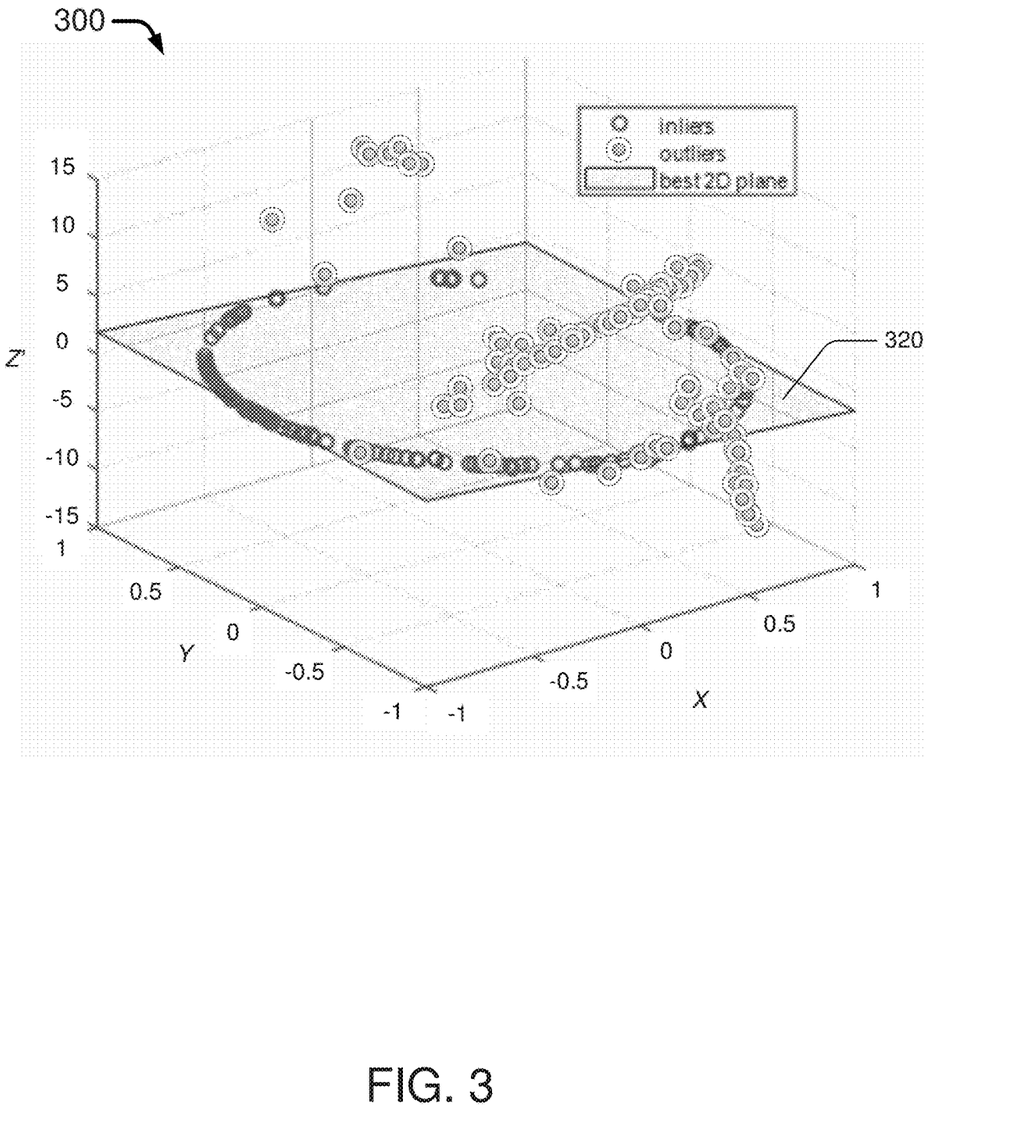
FIG. 3 is a diagram illustrating a result of a random sample consensus algorithm in accordance with the present disclosure.

FIG. 3 illustrates an example mathematical space 300, and some representative points within mathematical space 300 that represent or are otherwise derived from measurement data of some stationary and moving objects as detected by radars of vehicle 10. As shown in FIG. 3, representative points of measurement data detecting stationary objects are largely located on a 2D plane 320 (referred as the "best-fit plane"), or near plane 320 within a predetermined vicinity, as the coordinates of those representative points fulfill equation (9) or, equivalently, equation (17). These representative points that are on or near the best-fit plane 320 are referred as "inliers" and are deemed by the RANSAC algorithm as representing measurement data from stationary objects in the surrounding environment of vehicle 10. The inliers are used to construct or otherwise form a least squares problem as represented by equation (17), and the dynamic variables of vehicle 10 in the least squares problem, i.e., linear velocities $v_{C_x}$ and $v_{C_y}$, may be obtained accordingly by solving equation (17).

On the other hand, other representative points of FIG. 3, which are farther away from the best-fit plane 320, are referred as "outliers". The outliers are deemed by the RANSAC algorithm as representing measurement data from moving objects in the surrounding environment of vehicle 10. The outliers are not located on or near plane 320 since they represent measurement data from moving objects, and thus the coordinates of the outliers do not fulfill equation (9) or equation (17). In contrast to the inliers, the outliers are excluded from being used to construct or otherwise form the least squares problem represented by equation (17).

In short, the RANSAC algorithm is intended to find the best-fit plane 320 that fits the most number of representative points in FIG. 3. Once the best-fit plane 320 is found, only the inliers associated with plane 320 are used to construct the least squares problem of the linear and/or angular velocities of a vehicle the radar odometry intends to determine. The least squares problem is then solved to determine of the linear and/or angular velocities.

Figure 4:
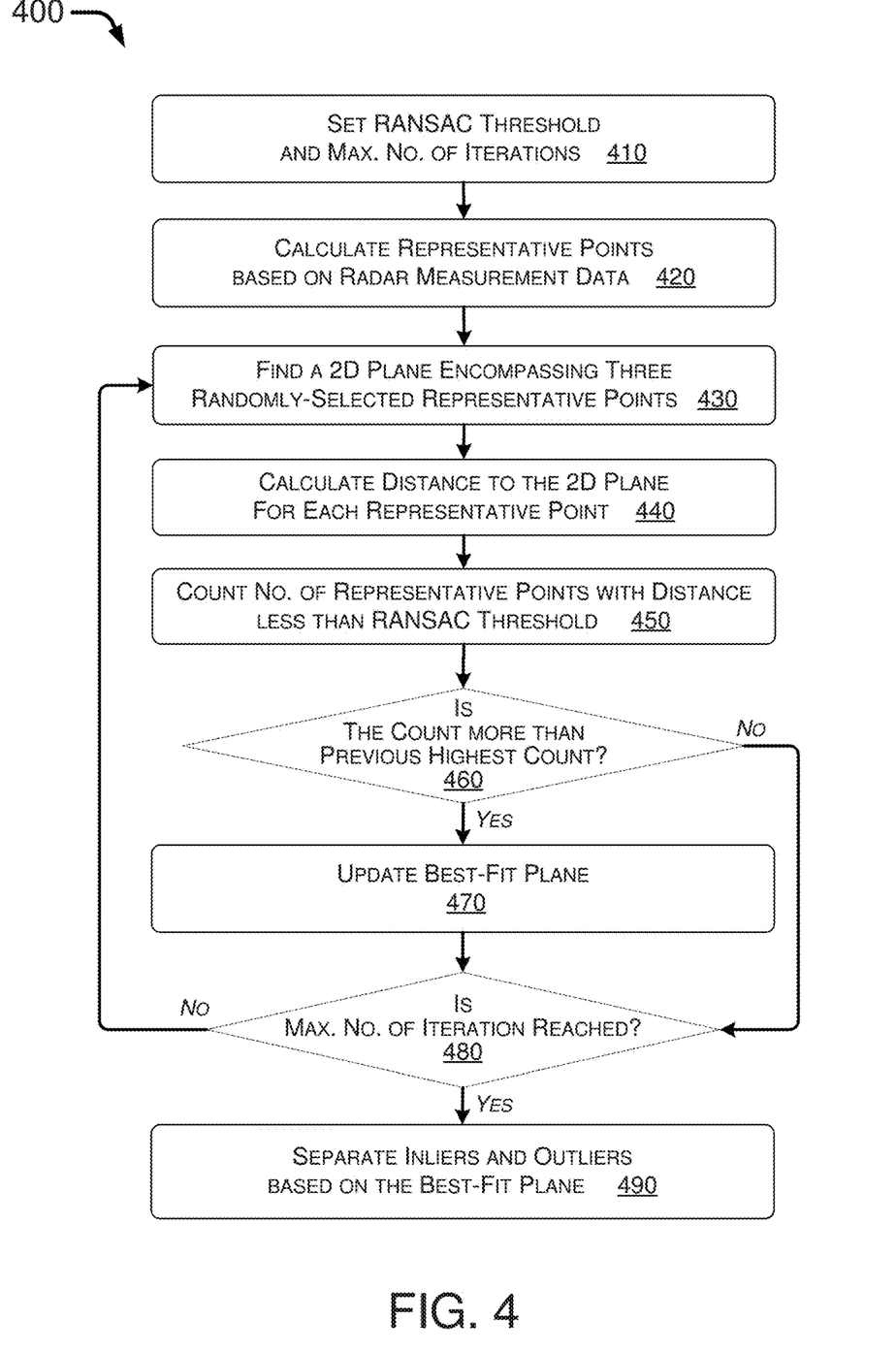
FIG. 4 is a flowchart depicting an example process in accordance with an embodiment of the present disclosure.

The RANSAC iteration process described above for vehicle 10 of FIG. 1 may be implemented using process 400 shown in FIG. 4. Process 400 may include one or more operations, actions, or functions shown as blocks such as 410, 420, 430, 440, 450, 460, 470, 480 and 490 of FIG. 4. Although illustrated as discrete blocks, various blocks of process 400 may be divided into additional blocks, combined into fewer blocks, or eliminated, depending on the desired implementation. Process 400 may begin at block 410.

At 410, process 400 may involve a processor (e.g., a computer or an application-specific integrated circuit) setting a RANSAC threshold (that has a positive value, as well as a maximum number of RANSAC iterations M that is a positive integer. Process 400 may proceed from 410 to 420.

At 420, process 400 may involve the processor calculating coordinates of representative points in a 3D mathematical space based on radar measurement data, with each of the representative points corresponding to a detection of one of the K objects by one of the N radars. Each of the coordinates of a representative point, as described above, may comprise a corresponding element of matrices X, Y and Z' as defined in equations (11), (12) and (18), i.e., $\cos(\theta_k''+\phi'')$, $\sin(\theta_k''+\phi'')$ and $r_{CR_x}''\dot\psi \sin(\theta_k''+\phi'')-r_{CR_y}''\dot\psi \cos(\theta_k''+\phi'')+\dot r_k''$. Process 400 may proceed from 420 to 430.

At 430, process 400 may involve the processor randomly selecting three representative points and finding a 2D plane that encompasses the three randomly-selected representative points. Process 400 may proceed from 430 to 440.

At 440, process 400 may involve the processor calculating the distance between each representative point to the 2D plane found at block 430. The calculation of the distance may be executed through a series of vector operations. For example, let the three randomly-selected representative points at block 430 be $\vec{p}_1$, $\vec{p}_2$, and $\vec{p}_3$, respectively. The normal vector $\vec{n}$ to the 2D plane that contains $\vec{p}_1$, $\vec{p}_2$, and $\vec{p}_3$, may be given by:

$$\vec{n} = (\vec{p}_2 - \vec{p}_1) \times (\vec{p}_3 - \vec{p}_1). \tag{20}$$

The distance between the 2D plane and a representative point in the 3D mathematical space may be found by firstly finding a vector between the representative point and the 2D plane and the subsequently calculating a dot product between the vector and $\vec{n}$. Specifically, let $\vec{q}_n$ be an n-th representative point in the 3D mathematical space. The distance $d_n$ between $\vec{q}_n$ and the 2D plane that contains $\vec{p}_1$, $\vec{p}_2$, and $\vec{p}_3$ is given by:

$$d_n = \vec{n} \cdot (\vec{q}_n - \vec{p}_1) / |\vec{n}|. \tag{21}$$

Process 400 may proceed from 440 to 450.

At 450, process 400 may involve the processor counting or tallying the number of representative points having a distance from the 2D plane that is less than ζ. The more representative points that are close to a 2D plane within ζ, the better fit the 2D plane is to separate the outliers from the inliers. That is, the best fit 2D plane is able to differentiate the outliers and the inliers most accurately. The inliers of the measurement data determined by the best fit 2D plane that is found through the RANSAC iteration process 400 would thus form a least squares problem that has the minimum skew or disturbance caused by measurement data that are from the outliers (i.e., measurement data from moving objects). Process 400 may proceed from 450 to 460.

At 460, process 400 may involve the processor determining whether the count obtained at block 450 is more than a previous highest count obtained in the RANSAC iteration. In an event that the count obtained at block 450 is not greater than a previous highest count, process 400 may proceed from 460 to 480 without updating the best-fit 2D plane at block 470. In an event that the count obtained at block 450 is greater than a previous highest count, process 400 may proceed from 460 to 470.

At 470, process 400 may involve the processor updating the best-fit 2D plane to be the 2D plane found in the current round of iteration at block 430. Process 400 may proceed from 470 to 480.

At 480, process 400 may involve the processor checking whether the maximum number of iterations, M, as set at block 410, has been reached. In an event that the maximum number of iterations has not been reached, process 400 may proceed from 480 to 430 for another around of iteration. In an event that the maximum number of iterations has been reached, process 400 may proceed from 480 to 490.

At 490, process 400 may involve the processor separating inliers and outliers, among the representative points, based on the best-fit 2D plane found in the iterations. The inliers may then be used to construct a least squares problem such as one represented by equation (17).

Although the method of radar odometry as described in detail above, including equations (1)-(21) as well as process 400, is demonstrated using a vehicle traversing a 2D plane (e.g., vehicle 10 traversing 2D plane 120 as shown in FIG. 1), the same method may be applicable to embody radar odometry for a vehicle traversing a 3D space (e.g., vehicle 50 traversing 3D space as shown in FIG. 1). That is, for a vehicle traversing a 3D space, the radar odometry method may likewise involve detecting a plurality of stationary and moving objects within the 3D space using a plurality of radars of the vehicle traversing the 3D space to obtain measurement data, performing a RANSAC calculation based on the measurement data to identify measurement data from the stationary objects, as well as forming a least squares problem of dynamic variables of the vehicle using the measurement data from the stationary objects. For a target in the 3D space, measurement data may also include an elevation angle (i.e., the angle between the ground surface and a position vector extending from a radar of vehicle 50 to the target), in addition to radial distance, radial speed and azimuth angle as in the case of a target on a 2D plane. Namely, for the 3D embodiment of radar odometry, equations similar to equations (1)-(21) above for 2D embodiment of radar odometry may be derived, and a RANSAC process similar to process 400 of FIG. 4 may be employed, thereby resulting in accurate estimates of linear and angular velocities of the vehicle traversing the 3D space, such as longitudinal velocity 51, lateral velocity 52, vertical velocity 53, roll rate 54, pitch rate 55 and yaw rate 56 of vehicle 50 as shown in FIG. 1. It is worth noting that, for 3D embodiments, given that as many as six dynamic variables are to be solved, each of the representative points may be a point within a seven-dimensional hyperspace, and thus have as many as six coordinate components. The best-fit plane to be found in the RANSAC iteration would be a six-dimensional hyperplane that is close to a majority of the representative points.

Figure 5:
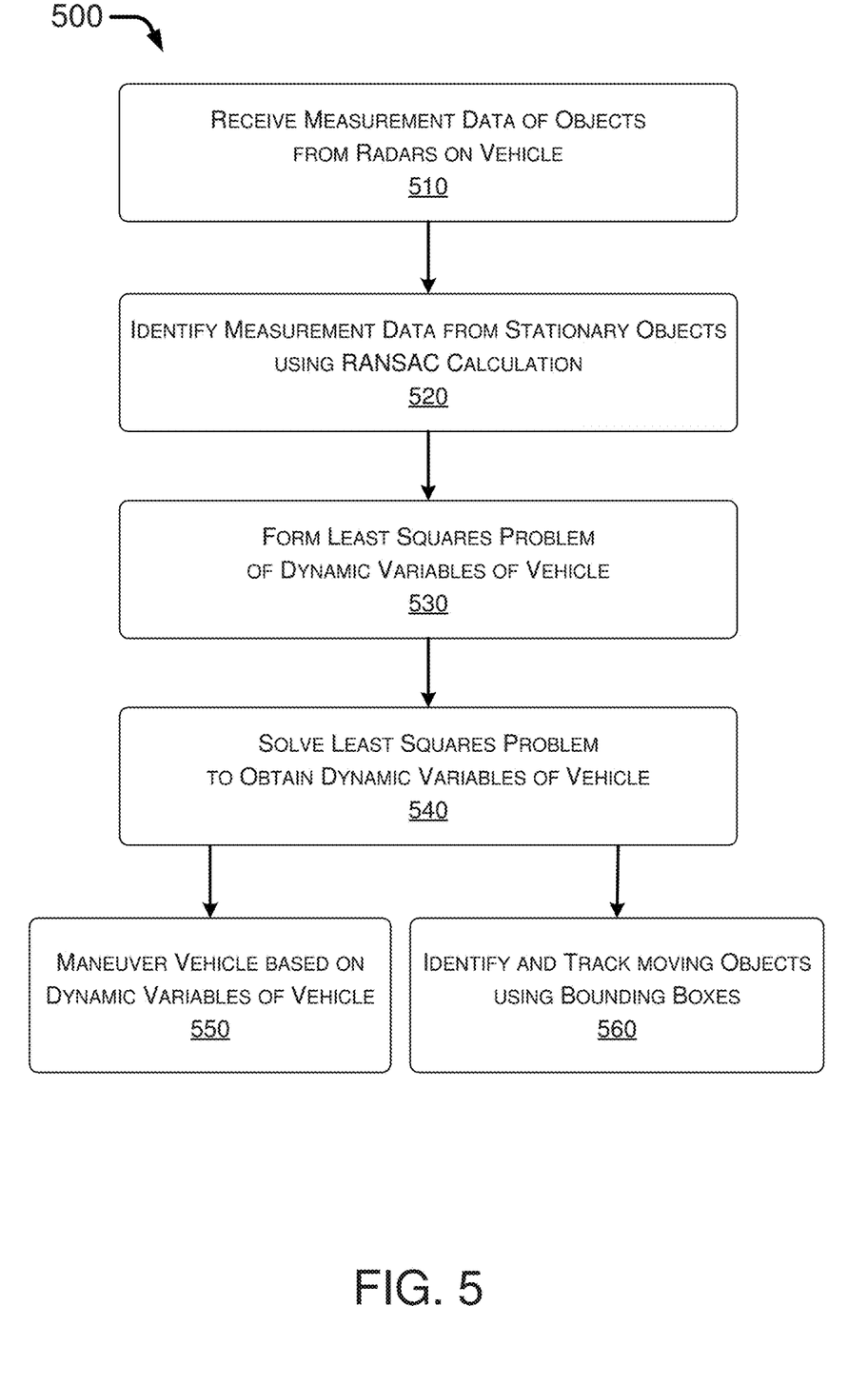
FIG. 5 is a flowchart depicting another example process in accordance with an embodiment of the present disclosure.

FIG. 5 illustrates a flowchart depicting an example process 500 of radar odometry in accordance with an embodiment of the present disclosure. Process 500 may include one or more operations, actions, or functions shown as blocks such as 510, 520, 530, 540, 550 and 560 of FIG. 5. Although illustrated as discrete blocks, various blocks of process 500 may be divided into additional blocks, combined into fewer blocks, or eliminated, depending on the desired implementation. Process 500 may be applicable to both vehicle 10 of FIG. 1 traversing 2D plane 120 thereof, as well as vehicle 50 of FIG. 1 traversing 3D space 130 thereof. Process 500 may begin at block 510.

At 510, process 500 may involve a processor (e.g., a computer or an application-specific integrated circuit) receiving measurement data of stationary and/or moving objects as detected or measured by one or more radars disposed in or on a vehicle as the vehicle is traversing a surrounding environment. As described above, the measurement data may include a radial distance, a radial speed, an azimuth angle, an elevation angle, or a combination of two or more thereof, of a stationary or moving object (e.g., target 60 of FIG. 2). Process 500 may proceed from 510 to 520.

At 520, process 500 may involve the processor performing a RANSAC calculation (e.g., process 400 of FIG. 4) using the measured data received at 510. The result of the RANSAC calculation may be used to identify which of the measurement data received at 510 are from stationary objects, and which of the measurement data received at 510 are from moving objects. For example, as shown in FIG. 3, measurement data associated with the "inliers" of FIG. 3 (i.e., representative points that are located on or near plane 320) may be identified as measurement data from stationary objects. On the other hand, measurement data associated with the "outliers" of FIG. 3 (i.e., representative points that are located farther away from plane 320) may be identified as measurement data from moving objects. Process 500 may proceed from 520 to 530.

At 530, process 500 may involve the processor forming a least squares problem of one or more dynamic variables (e.g., linear velocities 11, 12, 51, 52 and 53 as well as angular velocities 13, 54, 55 and 56 illustrated in FIG. 1) using the measurement data from stationary objects as identified at 520. As described above, the least squares problem may include a set of first order linear equations of the one or more dynamic variables (e.g., equations (15) or (17) shown above). Each of the first order linear equations has coefficients that are associated with, or relevant to, the measurement data of the stationary objects as detected by the radars, as well as installation parameters of the radars (e.g., mounting angle $\phi$ and position vector $\vec{r}_{CR}$ as shown in FIG. 2). For example, each element of matrices X, Y, Z, Z' and W derived above is a coefficient of a first order linear equation of the least squares problem. Process 500 may proceed from 530 to 540.

At 540, process 500 may involve the processor solving the least squares problem formed at 530 and obtain the dynamic variables of the vehicle that characterize how the vehicle is traversing the environment surrounding the vehicle. For example, longitudinal velocity 11, lateral velocity 12 and yaw rate 13 of vehicle 10 of FIG. 1 may be obtained substantially simultaneously by solving the least squares problem represented in equation (17) using equation (19).

In some embodiments, at 540, process 500 may further involve the processor calculating one or more secondary variables based on the dynamic variables obtained. For example, the processor may solve the least squares problem and obtain a longitudinal velocity and a lateral velocity of the vehicle, and further calculate a sideslip angle, as a secondary variable, of the vehicle directly from a ratio between the longitudinal velocity and the lateral velocity. A sideslip angle is defined as the angle between the vehicle's actual direction of travel and the vehicle's intended heading direction. Sideslip angle plays an important role in many areas of vehicle dynamics, including stability control of the vehicle. However, estimation of sideslip angle has been difficult in existing odometry methods, in particular due to inaccurate estimation of lateral velocity of the vehicle. In contrast, radar odometry according to the present disclosure is able to calculate sideslip angle directly from longitudinal and lateral velocities in a real-time manner, resulting in an estimation of sideslip angle with high accuracy.

In some embodiments, process 500 may end at 540. In some embodiments, process 500 may proceed from 540 to perform further estimations, calculations, applications or post-processing of data. For example, process 500 may proceed from 540 to 550 to maneuver the vehicle, or proceed from 540 to 560 to identify and track the moving objects, as described below. It should be noted that 550 and 560 are examples of further steps that the processor can carry out following step 540, and are not intended to be limiting.

At 550, process 500 may involve the processor maneuvering the vehicle based on the dynamic variables and/or other secondary variables obtained at 540, especially if the vehicle is an autonomous vehicle. That is, the processor may control, adjust, calibrate or navigate the vehicle, sometimes through an autonomous driving controller equipped in the vehicle, based on the linear velocities, angular velocities and/or the sideslip angle obtained at 540.

At 560, process 500 may involve the processor identifying, based on the dynamic variables and/or other secondary variables obtained at 540, one or more of the moving objects. Process 500 may also involve the processor tracking the one or more moving objects while the vehicle is traversing the surrounding environment. In some embodiments, the processor may identify and/or track the one or more moving objects by setting an imaginary box, referred as a bounding box, around one or more of the moving objects. A bounding box may be set around a cluster of moving objects, i.e., a plurality of moving objects that are close in space, especially if they are moving at substantially same velocity. The bounding box around a cluster of moving objects may be regarded by the processor as a moving vehicle in the surrounding environment.

Figure 6:
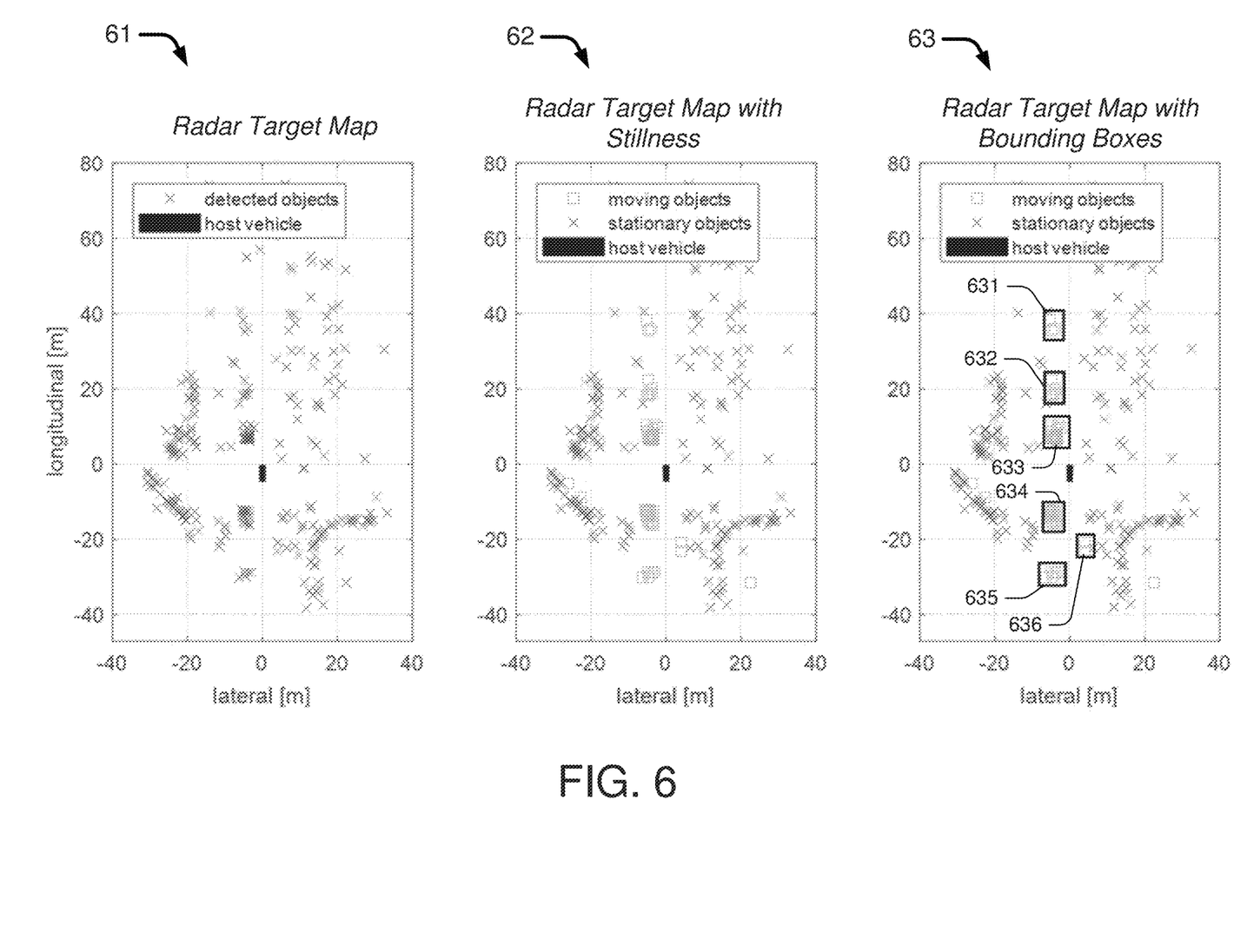
FIG. 6 shows radar target maps with and without stillness labeling in accordance with an embodiment of the present disclosure.

FIG. 6 may be used to further illustrate the concept of the bounding box described above. As shown in FIG. 6, a vehicle equipped with one or more radars, referred as "host vehicle" in FIG. 6, is represented by a box of solid color at the center of each of graphs 61, 62 and 63 around the location having coordinate (0, 0). Graph 61 of FIG. 6 illustrates a radar target map with the host vehicle located at (0, 0) of the map, as well as a plurality of stationary or moving objects as detected by the radars of the host vehicle. Note that a physical entity in the environment, such as a bus, a truck, a billboard or a building, may contribute to more than one object mark in graph 61. For example, as a truck drives by the host vehicle, various parts of the truck at different locations of the truck may each be detected by a radar of the host vehicle, contributing a corresponding object mark on the radar target map of graph 61.

With the least squares problem having been formed in block 530 of process 500 and subsequently solved for the dynamic variables of the host vehicle in block 540 of process 500, the processor of process 500 is able to determine stillness of an object, i.e., to identify whether an object detected by the radars is moving or stationary. Specifically, equation (8) may be employed to determine stillness of an object in an environment that vehicle 10 of FIG. 1 is traversing. Let $\dot{r}_k^n$ and $\theta_k^n$ be the radial speed measurement and the azimuth angle measurement, respectively, of the object as detected by the nth radar of vehicle 10. With longitudinal velocity $v_{C_x}$, lateral velocity $v_{C_y}$ and yaw rate $\dot{\psi}$ obtained in block 540 of process 500, the object is deemed stationary if and only if the following condition is fulfilled:

$$|\dot{r}_k^n + (v_{C_y} + r_{CR_x}^n \dot{\psi})\sin(\theta_k^n + \phi^n) + (v_{C_x} - r_{CR_x}^n \dot{\psi})\cos(\theta_k^n + \phi^n)| < \max(\dot{r}_n^n), \quad (22)$$

wherein $\dot{r}_n^n$ is additive noise of radial speed measurement in nth radar. Note that the left-hand side of (22) depends only on $v_{C_x}$, $v_{C_y}$, $\dot{\psi}$, $\dot{r}_k^n$, and $\theta_k^n$, which are available every cycle of radar operation. Also note that the upper bound of the condition (22) is $\max(\dot{r}_n^n)$, which is usually a small number, as Doppler radar is the most accurate measurement among various types of automotive radars.

Once the processor determines the stillness of each of the objects in graph 61 using condition (22), the processor may update graph 61 with the stillness information to result in graph 62 of FIG. 6, wherein stationary objects are labeled differently from moving objects. The processor may further proceed to place or otherwise set a boundary box around a cluster of moving objects, especially if the cluster of moving objects are moving in a same direction with similar speed. As shown in graph 63 of FIG. 6, bounding boxes 631, 632, 633, 634, 635 and 636 have been set around or otherwise assigned to a few clusters of moving objects therein. Each of the bounding boxes may represent a moving physical entity, such as a truck driving by the host vehicle.

It is worth noting that the processor may be able to execute or otherwise carry out steps 510-560 of process 500 in a relatively short period of time (e.g., a few milliseconds to a few hundreds of milliseconds) such that process 500 may provide real-time or pseudo-real-time radar optometry in an application sense.

Figure 7:
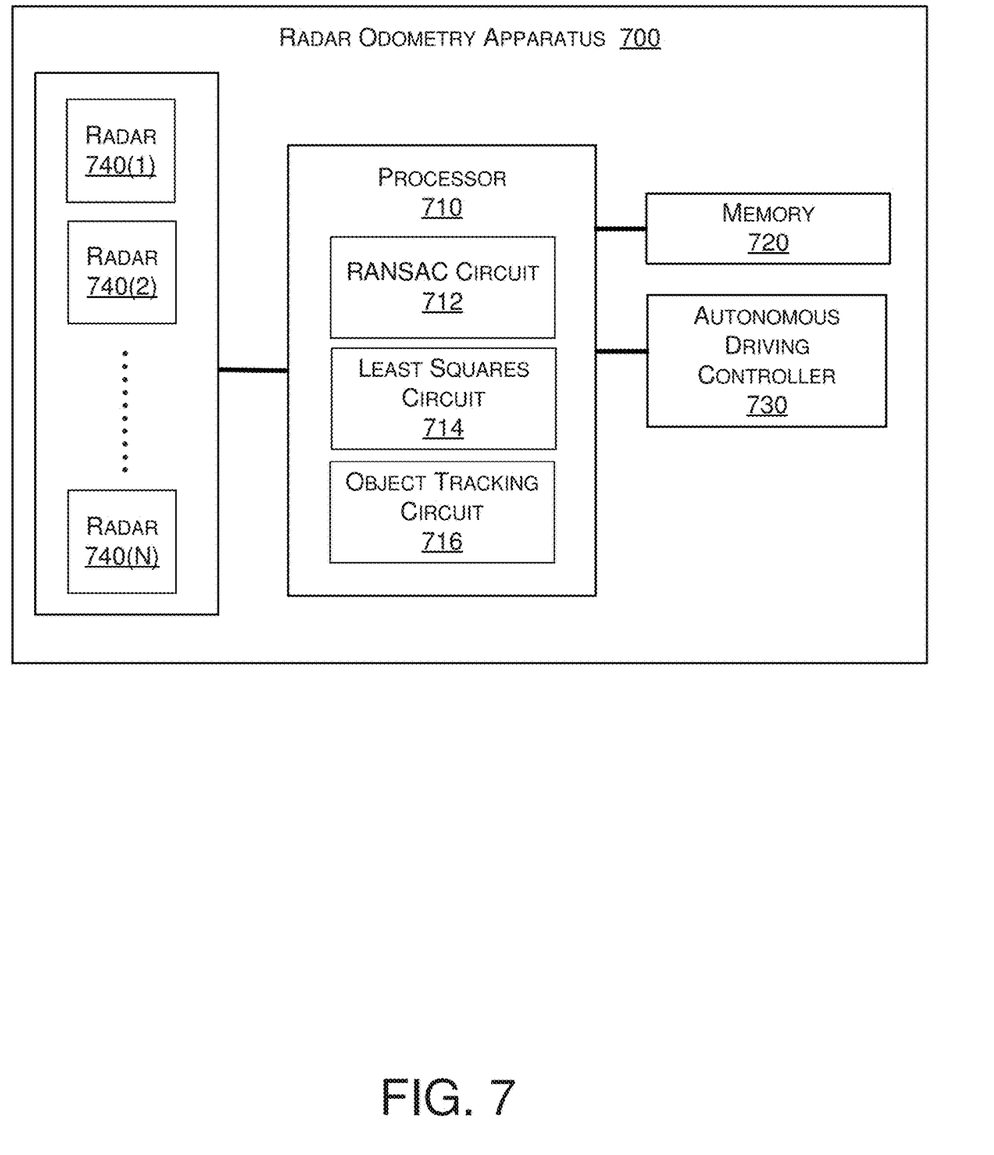
FIG. 7 is a block diagram depicting an example apparatus in accordance with an embodiment of the present disclosure.

FIG. 7 illustrates an example block diagram of a radar odometry apparatus 700 (hereinafter referred as "apparatus 700") implementable to a vehicle, such as vehicle 10 and vehicle 50 of FIG. 1. Apparatus 700 may include one or more radar devices, such as radars 740(1), 740(2) . . . , and 740(N) as shown in FIG. 7. Apparatus 700 may also include a processor 710 and a memory 720 accessible to processor 710. Processor 710 may be communicatively coupled to radars 740(1)-740(N), as well as to memory 720. Memory 720 may store one or more sets of installation parameters, and each set of the installation parameters is associated with a corresponding one of the radars. For each radar, the associated set of installation parameters may include a mounting angle of the radar, as well as a location of the radar relative to a reference point of the vehicle, which is often represented by a position vector extending from the reference point of the vehicle to the radar.

In some embodiments, processor 710 may include a RANSAC circuit 712 capable of performing a RANSAC calculation as carried out in block 520 of process 500 of FIG. 5. That is, RANSAC circuit 712 may be capable of performing the RANSAC calculation as described by process 400 of FIG. 4, and find a best-fit plane (e.g., plane 320 of FIG. 3) that may be used to separate or otherwise differentiate inliers that represents measurement data from stationary objects from outliers that represents measurement data from moving objects, as shown in FIG. 3.

In some embodiments, processor 710 may also include a least squares circuit 714 that may be used to obtain instantaneous linear velocities (e.g., 11, 12, 51, 52 and 53 in FIG. 1) and/or angular velocities (e.g., 13, 54, 55 and 56 in FIG. 1) of the vehicle per each radar cycle. Specifically, least squares circuit 714 may be capable of forming a least squares problem of the linear and/or angular velocities, such as the least squares problem represented by equation (9), (15) or (17), based on measurement data from stationary objects. In addition, least squares circuit 714 may also be capable of solving the least squares problem to obtain the values of the linear and/or angular velocities of the vehicle. In some embodiments, processor 710 may be also capable of calculating one or more secondary variables, such as a sideslip angle, based on the values of the linear and/or angular velocities obtained by least squares circuit 714.

In some embodiments, processor 710 may further include an object tracking circuit 716 capable of tracking one or more moving objects on a radar target map by setting a bounding box, such as bounding boxes shown in graph 63 of FIG. 6, around a cluster of moving objects that may be moving in substantially a same direction at substantially a same speed.

In some embodiments, apparatus 700 may also include an autonomous driving controller 730, especially when apparatus 700 is implemented in an autonomous vehicle. Through autonomous driving controller 730, processor 710 may be capable of maneuvering the autonomous vehicle based on the one or more linear or angular velocities obtained by least squares circuit 714, as well as secondary variables derived by processor 710 from the one or more linear or angular velocities, such as the sideslip angle.

It is apparent that, although described with respect to one or more radar devices, all aspects described above may apply equally to any type of sensors that are capable of measuring Doppler frequency, such as lidar devices or ultrasonic sensors.

In the above disclosure, reference has been made to the accompanying drawings, which form a part hereof, and in which is shown by way of illustration specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method, comprising:
  receiving, by a processor from one or more radars disposed on or in a vehicle, measurement data of a plurality of stationary objects and a plurality of moving objects located in an environment the vehicle traverses;
  performing, by the processor, a random sample consensus (RANSAC) calculation to identify the measurement data of the stationary objects;
  calculating, by the processor, one or more dynamic variables of the vehicle based on the measurement data of the stationary objects;
  tracking, by the processor, one or more clusters of multiple moving objects among the plurality of moving objects based on the measurement data by identifying each of the one or more clusters with a respective bounding box around the cluster; and
  maneuvering, by the processor, the vehicle based on the one or more dynamic variables.

2. The method of claim 1, wherein the measurement data comprises a radial distance, a radial speed, an azimuth angle, an elevation angle, or a combination of two or more thereof, of one of the stationary objects and the moving objects as detected by one of the one or more radars.

3. The method of claim 1, wherein the environment comprises a two-dimensional (2D) plane, and wherein the one or more dynamic variables of the vehicle comprise a longitudinal velocity, a lateral velocity and a yaw rate of the vehicle.

4. The method of claim 1, wherein the environment comprises a three-dimensional (3D) space, and wherein the one or more dynamic variables of the vehicle comprise a longitudinal velocity, a lateral velocity, a vertical velocity, a roll rate, a pitch rate and a yaw rate of the vehicle.

5. The method of claim 1, wherein the performing of the RANSAC calculation to identify the measurement data of the stationary objects comprises:
  calculating a plurality of representative points in a mathematical space, each of the representative points associated with respective measurement data of one of the stationary objects or moving objects as detected by one of the one or more radars;
  finding a best-fit plane in the mathematical space that encompasses a majority of the representative points within a predetermined threshold;
  identifying one or more of representative points located within the predetermined threshold from the best-fit plane as inliers; and
  designating a part of the measurement data associated with the inliers as the measurement data of the stationary objects.

6. The method of claim 1, wherein the calculating of the one or more dynamic variables comprises:
  forming a least squares problem of the one or more dynamic variables, the least squares problem comprising a set of first order linear equations each having coefficients relevant to the measurement data of the stationary objects; and solving the least squares problem to obtain values of the one or more dynamic variables.

7. The method of claim 1, wherein the calculating of the one or more dynamic variables is further based on one or more sets of installation parameters, and wherein each of the one or more sets of installation parameters is associated with a corresponding one of the one or more radars.

8. The method of claim 7, wherein each of the one or more sets of installation parameters comprises a mounting angle of the corresponding one of the one or more radars and a position vector extending from a reference point of the vehicle to the corresponding one of the one or more radars.

9. The method of claim 7, wherein the calculating of the one or more dynamic variables comprises:
forming a least squares problem of the one or more dynamic variables, the least squares problem comprising a set of first order linear equations each having coefficients relevant to the measurement data of the stationary objects and the one or more sets of installation parameters; and
solving the least squares problem to obtain values of the one or more dynamic variables.

10. The method of claim 1, wherein each cluster comprises more than one moving objects of the plurality of moving objects that are moving in a same direction with a same speed.

11. A radar odometry apparatus implementable in a vehicle, comprising:
one or more radars disposed in or on the vehicle, each of the one or more radars configured to receive measurement data of one or more objects in an environment which the vehicle is traversing;
a memory configured to store one or more sets of installation parameters, each of the one or more sets of installation parameters associated with a corresponding one of the one or more radars; and
a processor communicatively coupled to the memory and the one or more radars, the processor configured to calculate one or more linear or angular velocities of the vehicle based on the measurement data and the one or more sets of installation parameters, the processor also configured to track one or more clusters of multiple moving objects among a plurality of moving objects based on the measurement data by identifying each of the one or more clusters with a respective bounding box around the cluster, the processor further configured to maneuver the vehicle based on one or more dynamic variables from the calculating.

12. The radar odometry apparatus of claim 11, wherein the one or more objects comprise one or more stationary objects that are stationary in the environment, and wherein the measurement data of the one or more objects comprises a radial distance, a radial speed, an azimuth angle, an elevation angle, or a combination of two or more thereof, of the one or more stationary objects.

13. The radar odometry apparatus of claim 11, wherein each of the one or more sets of installation parameters comprises a mounting angle of the corresponding one of the one or more radars and a position vector extending from a reference point of the vehicle to the corresponding one of the one or more radars.

14. The radar odometry apparatus of claim 11, wherein the environment comprises a two-dimensional (2D) plane, and wherein the one or more linear or angular velocities of the vehicle comprise a longitudinal velocity, a lateral velocity and a yaw rate of the vehicle.

15. The radar odometry apparatus of claim 11, wherein the environment comprises a three-dimensional (3D) space, and wherein the one or more linear or angular velocities of the vehicle comprise a longitudinal velocity, a lateral velocity, a vertical velocity, a roll rate, a pitch rate and a yaw rate of the vehicle.

16. The radar odometry apparatus of claim 11, wherein:
the one or more objects comprise one or more stationary objects that are stationary in the environment and a plurality of moving objects including the multiple moving objects that are moving in the environment, and
the processor comprises a random sample consensus (RANSAC) circuit capable of differentiating respective measurement data of the one or more stationary objects from respective measurement data of the plurality of moving objects.

17. The system of claim 16, wherein the processor further comprises a least squares circuit capable of calculating the one or more linear or angular velocities of the vehicle based on the respective measurement data of the one or more stationary objects and the one or more sets of installation parameters.

18. The radar odometry apparatus of claim 11, wherein the one or more linear or angular velocities of the vehicle comprise a longitudinal velocity and a lateral velocity of the vehicle, and wherein the processor is further capable of calculating a sideslip angle based on a ratio between the longitudinal velocity and the lateral velocity.

19. The radar odometry apparatus of claim 11, further comprising an autonomous driving controller, wherein the vehicle is an autonomous vehicle, and wherein the processor is further capable of maneuvering the autonomous vehicle through the autonomous driving controller based on the one or more linear or angular velocities.

20. The radar odometry apparatus of claim 11, wherein each cluster comprises more than one moving objects of the plurality of moving objects that are moving in a same direction with a same speed.

* * * * *